United States Patent
Kurihara

(10) Patent No.: US 9,168,587 B2
(45) Date of Patent: Oct. 27, 2015

(54) FINE COATED COPPER PARTICLES AND METHOD FOR PRODUCING SAME

(71) Applicant: YAMAGATA UNIVERSITY, Yamagata-shi, Yamagata (JP)

(72) Inventor: Masato Kurihara, Yamagata (JP)

(73) Assignee: YAMAGATA UNIVERSITY, Yamagata (JP)

( * ) Notice: Subject to any disclaimer, the term of this patent is extended or adjusted under 35 U.S.C. 154(b) by 0 days.

(21) Appl. No.: 13/850,699

(22) Filed: Mar. 26, 2013

(65) Prior Publication Data

US 2013/0248775 A1    Sep. 26, 2013

Related U.S. Application Data

(63) Continuation of application No. PCT/JP2011/071680, filed on Sep. 22, 2011.

(30) Foreign Application Priority Data

Sep. 27, 2010  (JP) ................................. 2010-215910

(51) Int. Cl.
  *B22F 9/20*  (2006.01)
  *B22F 9/30*  (2006.01)
  *B22F 1/00*  (2006.01)
  *B82Y 30/00*  (2011.01)

(52) U.S. Cl.
  CPC .................. *B22F 9/20* (2013.01); *B22F 1/0018* (2013.01); *B22F 1/0022* (2013.01); *B22F 1/0062* (2013.01); *B22F 9/30* (2013.01); *B82Y 30/00* (2013.01)

(58) Field of Classification Search
  CPC ....................................................... B22F 9/20
  USPC ................ 252/512; 556/40; 75/343, 363, 373
  See application file for complete search history.

(56) References Cited

U.S. PATENT DOCUMENTS

| 7,625,637 | B2 * | 12/2009 | Kim ............................... 428/570 |
| 9,006,296 | B2 * | 4/2015 | Itoh et al. ......................... 516/31 |
| 2008/0206488 | A1 * | 8/2008 | Chung et al. ................... 427/596 |
| 2009/0029148 | A1 * | 1/2009 | Hashimoto et al. ........... 428/323 |
| 2009/0148600 | A1 | 6/2009 | Li et al. |

FOREIGN PATENT DOCUMENTS

| JP | 2007-200659 A | 8/2007 |
| JP | 2007-200660 A | 8/2007 |
| JP | 2007-321215 A | 12/2007 |
| JP | 2008-069374 A | 3/2008 |
| JP | 2008-214695 A | 9/2008 |
| JP | 2009-144241 A | 7/2009 |
| JP | 2010-024526 A | 2/2010 |

OTHER PUBLICATIONS

D. Gajapathy et al., "Synthesis, Characterisation and Thermal Properties of Hydrazinium Metal Oxalate Hydrates, Crystal and Molecular Structure of Hydrazinium Copper Oxalate Monohydrate", Polyhedron, 1983, vol. 2, No. 9, pp. 865-873.

M. Kawazome et al., "NANO Particles Fine Pitch Wiring for Printed Electronics", Pulverization, 2006/2007, No. 50, pp. 27-31.

Office Action issued in Japanese Patent Application No. 2010-215910 mailed Jan. 6, 2015 (with translation).

* cited by examiner

*Primary Examiner* — Douglas McGinty
(74) *Attorney, Agent, or Firm* — Foley & Lardner LLP

(57) ABSTRACT

Provided are fine coated copper particles, which are fine with a narrow particle size distribution and superior storability, and which can be sintered at low temperatures. Specifically provided is a method for producing fine coated copper particles which is characterized by including: a step of mixing a copper-containing compound and a reducing compound to form a composite compound that is capable of thermal decomposition to generate copper in an alkylamine; and a step of heating the composite compound in the alkylamine to produce fine copper particles coated with the alkylamine.

6 Claims, 3 Drawing Sheets

FINE COATED COPPER PARTICLES AND METHOD FOR PRODUCING SAME

The application is a continuation application of PCT/JP2011/071680, filed on Sep. 22, 2011.

BACKGROUND OF THE INVENTION

1. Field of the Invention

The present invention relates to fine coated copper particles of a nanometer size that have superior dispersibility in a solvent and demonstrate favorable electrical conductivity as a result of low-temperature sintering on a flexible printed board and the like, a method for producing the same, and a sintered copper adherend using the same.

2. Description of Related Art

In the background of recent remarkable progress of electronic devices, there exist advances of semiconductor devices and other electronic components, and the considerable developments of printed wiring substrates on which these electronic components are mounted. For many of these electronic devices there is a need for compact size, reduced thickness, and lightweight, and furthermore, improved productivity. Therefore, printed wiring substrates have also been required to have various contrivances and improvements to deal with this need. In particular, to achieve these requirements, there is a demand for higher speed and higher density to mount the material of electrically conductive wiring for the electronic components.

Amidst such circumstances, nanosized fine metal particles are currently expected to serve as one of such materials, and studies for this are now being conducted (for example, see Kawazome, M. et al., Pulverization, No. 50, 27-31 (2006/2007)).

As the fine metal particles to be used as such a wiring material, ones mainly formed of copper are preferable from the point of low electromigration. For this reason, means for providing nanosized fine copper particles have so far been studied. For example, in Japanese Unexamined Patent Publication No. 2010-24526, it is described that, as a method for producing fine copper particles, a fine copper powder is produced by reducing a precursor of fine copper particles by a treatment with a hydrazine derivative in water. However, forming a copper coating by sintering the thus produced fine copper powder at low temperatures has yet to be achieved. In addition, Japanese Unexamined Patent Publication No. 2007-321215 discloses a technique, as a method for producing fine copper particles, in which metal nanoparticles are produced by reducing an organic acid salt of a metal by treating a solution containing the metal salt and an amine with a reducing agent. It is described that the fine copper particles produced by this method attained electrical conductivity by sintering at about 300° C.

In the methods for producing fine copper particles according to the methods described in Japanese Unexamined Patent Publication No. 2010-24526 and Japanese Unexamined Patent Publication No. 2007-321215, metal copper is generated by previously preparing a copper-containing compound in a liquid, and charging a reducing agent thereto from the outside to cause the reduction reaction. Thus, it is inevitable for the speed of the progression of the reduction reaction to be limited by the supply of the reducing agent and such substances. For this reason, in a case of an actual production of fine copper particles, it is difficult to cause a reaction to generate uniform fine copper particles, due to uneven concentrations of the raw material substances in the reaction container, and the like. Thus, in particular, it becomes very difficult to uniformly produce a large amount of fine copper particles in the industrial production process, which is a problem.

On the other hand, Japanese Unexamined Patent Publication No. 2008-214695 discloses a technique for producing fine silver particles protected by protective films of oleylamine by: mixing silver oxalate with an excessive amount of oleylamine to allow them to react so as to form a complex compound; and thereafter heating the complex compound to decompose oxalate ions included in the complex compound so as to generate atomic silver. It is described that the method is able to provide fine silver particles which are ultra-fine with a narrow particle size distribution and superior storage stability.

According to this method, silver oxalate is thermally decomposed in oleylamine to generate atomic silver, and the aggregation thereof enables the production of fine silver particles. In this production method, silver atoms are generated by the decomposition of a single type of molecule, because of which, atomic silver can be generated evenly in the reaction system without a limitation on the speed of the reaction due to the supply of substances. Moreover, it is possible, by controlling the aggregation of atomic silver with the action of oleylamine, to produce fine silver particles with clean surfaces which are ultra-fine with a narrow particle size distribution and superior storage stability. As a result, the use of the fine silver particles produced by this method makes it possible to provide an ink for wiring formation with which wiring can be formed by sintering on the surface of a resin.

Regarding copper-containing compounds, if it is possible to generate atomic copper by self decomposition in a predetermined alkylamine, as described in Japanese Unexamined Patent Publication No. 2008-214695, it is also expected to produce fine copper particles coated with an alkylamine similarly to the fine silver particles.

However, generally speaking, a copper-containing compound has a large free energy change in its formation. Thus, mere heating is not always enough to generate atomic copper by self decomposition of the compound. Also, if a mixture containing the compound and an alkylamine is strongly heated; the alkylamine may be vaporized or degraded before the generation of atomic copper, another chemical reaction differing from the copper reduction reaction may occur between the compound and the alkylamine, or other such problems may occur. Thus, it is difficult to produce superior fine copper particles. For this reason, what is applicable to the method described in Japanese Unexamined Patent Publication No. 2008-214695 has been limited to compounds which are mainly composed of silver.

SUMMARY OF THE INVENTION

In order to solve the above-mentioned problems, it is an object of the present invention to provide a copper compound capable of self decomposition in an alkylamine, and to provide a method for producing fine coated copper particles having protective films composed of an alkylamine by causing self decomposition of the copper compound in the alkylamine to generate atomic copper. At the same time, it is also an object to provide fine coated copper particles, which are fine with a narrow particle size distribution and superior storability, and which can be sintered at low temperatures.

The present invention is characterized as follows in order to solve the above-mentioned problems.

That is, fine coated copper particles can be produced without a limitation on the rate due to the supply of substances related to the reaction, by having: a step of mixing a copper-containing compound and a reducing compound to form a composite compound that is capable of thermal decomposition to generate copper in an alkylamine; and a step of heating the composite compound in the alkylamine to produce fine copper particles coated with the alkylamine.

Moreover, the step to produce fine copper particles is performed at a temperature of 220° C. or lower.

In addition, the reducing compound contains hydrazine, hydroxylamine, or a derivative thereof.

Moreover, the copper-containing compound is a compound in which copper is bound by oxygen-based ligands, by which favorable production of fine coated copper particles is achieved.

Furthermore, the compound in which copper is bound by oxygen-based ligands is copper oxalate.

In addition, the alkylamine contains a long-chain alkylamine having a carbon number of 12 or more.

Furthermore, fine coated copper particles can be favorably produced without a limitation on the rate due to the supply of substances related to the reaction in an alkylamine, by using a composite compound which is capable of thermal decomposition to generate copper in the alkylamine at a temperature of 220° C. or lower, and is composed of a structure in which a reducing compound is coordinately bound to a copper-containing compound.

In addition, the reducing compound contains hydrazine, hydroxylamine, or a derivative thereof.

Moreover, the copper-containing compound is a compound in which copper is bound by oxygen-based ligands.

Furthermore, the compound in which copper is bound by oxygen-based ligands is copper oxalate.

According to the embodiment of the present invention, even a type of copper compound for which it is difficult to cause spontaneous decomposition can be subjected to spontaneous decomposition in a coexisting state with an alkylamine, by previously forming a composite compound with a reducing compound, and thus it becomes possible to produce fine coated copper particles coated with protective films of the alkylamine. Furthermore, in the present invention, it is possible to provide fine coated copper particles which can be stored for a long term even in air, by appropriately selecting a predetermined type of alkylamine for forming the films of the fine copper particles. Also it becomes possible to form a conductive film and a conductive wiring with favorable electrical conductivity, not by using a reducing gas, but by heating under an inert gas atmosphere at 300° C. or lower. In addition, it becomes possible to form a copper metal coating even at room temperature by removing the protective film with mechanical pressure or the like to cause sintering.

DETAILED DESCRIPTION OF THE PREFERRED EMBODIMENTS

Figure 1:
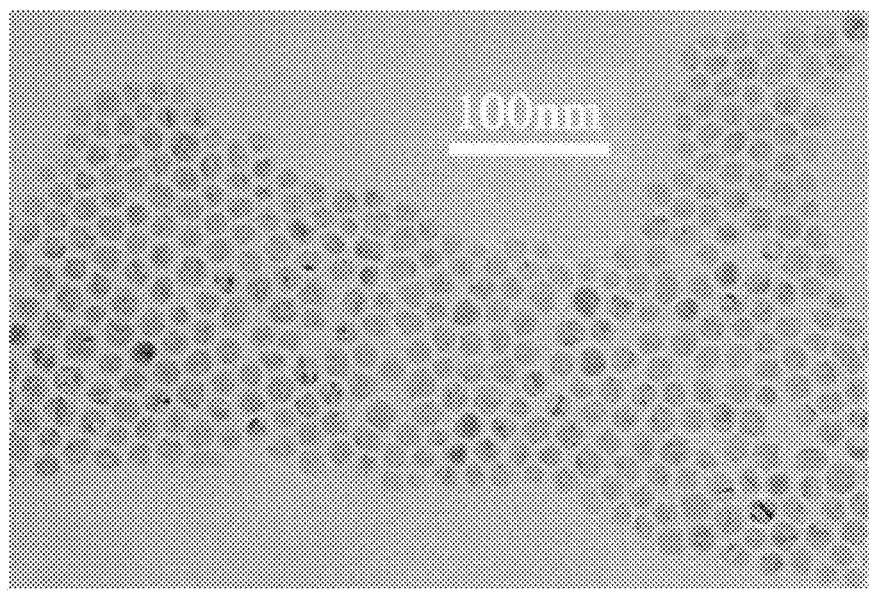
FIG. 1 is a transmission electron micrograph of fine coated copper particles observed after dropping a toluene-diluted dispersion of the fine coated copper particles obtained in Example 1 onto a microgrid, and drying the same.

Hereunder is a description of fine coated copper particles according to the present invention and a method for producing the same.

<Copper Compound Serving as a Supply Source of Copper Atoms>

In the method for producing fine coated copper particles according to the present invention, fine coated copper particles are produced with use of a copper-containing compound composed of a structure in which copper and other atoms (or group of atoms) are bound, as a supply source of copper atoms. Regarding the copper-containing compound for use in the present invention, a compound that can form a composite compound such as a complex with a reducing compound that will be described later can be used as the metal source of the fine coated copper particles. In the present invention, appropriately selecting for use, a compound which requires only a small amount of energy for the reduction and separation of copper atoms from the above-mentioned copper-containing compounds with consideration of the reducing power and the like of the reducing compound to be used, is desirable from the point of lowering the temperature for producing the fine coated copper particles and shortening the time for the production. Moreover, it is also desirable to use a copper-containing compound which does not contain any metal element other than copper, so as to reduce any impurities contained in the fine coated copper particles as a result of the production.

The copper-containing compound that can form a composite compound such as a complex with a reducing compound may be any compound in which ligands can be coordinated to copper atoms, and particularly preferred is a compound in which copper atoms are bound by oxygen-based ligands. In other words, when using a reducing compound that allows nitrogen to form coordinate bonds with copper atoms, it is preferable if the compound has a structure in which copper atoms are bound by oxygen-based ligands, because the reduction of copper is more likely to occur due to the strength of the coordinate bond.

Such a copper-containing compound can be exemplified by: organic or inorganic acid salts of copper such as copper oxalate, copper formate, copper acetate, copper propionate, copper butyrate, copper isobutyrate, copper valerate, copper isovalerate, copper pivalate, copper malonate, copper succinate, copper maleate, copper benzoate, copper citrate, copper tartrate, copper nitrate, copper nitrite, copper sulphite, copper sulfate, and copper phosphate; as well as complex compounds represented by copper acetylacetonate in which acetylacetone is coordinately bound.

Of the above-mentioned copper-containing compounds, it is particularly preferable in the present invention to use copper oxalate from the point of having a property to form a coordination polymer and having a chain polymer structure in which copper ions and oxalate ions are alternately linked. The use of copper oxalate having such a polymer structure can enable an improvement in the copper yield in the production of fine coated copper particles in a predetermined reaction medium as well as enabling uniformization of the particle size distribution of the fine coated copper particles, as will be described below. The reason for this is thought to be that; in a case of using a copper-containing compound which does not form a polymer structure, the distribution of copper atoms is uniform in the reaction medium, whereas in the case of using copper oxalate which has a polymer structure, copper atoms generated by the reduction reaction are non-uniformly distributed and are present at high density in some local areas in the reaction medium, which therefore suppresses the oxidization of the copper atoms even in an atmospheric synthesis, and helps the generated copper atoms to efficiently form copper particles.

<Reducing Compound and Formation of Composite Compound>

In the method for producing fine coated copper particles according to the present invention, firstly, a reducing compound having a reducing effect is mixed with the above-mentioned copper-containing compound so as to form a composite compound composed of the metal compound and the reducing compound. In such a composite compound, the reducing compound serves as an electron donor for the copper ions in the copper-containing compound, and thus the copper ions are more likely to be reduced. As a result, spontaneous separation of copper atoms by thermal decomposition is more likely to occur, as compared to if the copper-containing compound were used by itself. For this reason, the use of such a composite compound as a direct material for the supply of copper atoms enables the occurrence of a spontaneous decomposition reaction of the composite compound by setting the temperature, the pressure, and other conditions, without a limitation on the rate due to the supply of substances related to the reaction. By so doing, copper atoms are supplied, and it becomes possible to produce fine copper particles.

The reducing compound to be used for this purpose is preferably a compound having an amino group. This is because a reducing agent having an amino group is likely to form coordinate bonds with copper atoms and so forth in the copper-containing compound, and is capable of readily forming a composite compound with the copper-containing compound while keeping the structure of the copper-containing compound, as well as causing the copper reduction reaction.

Such a reducing compound is not particularly limited as long as it can form a composite compound capable of causing the reduction/separation of copper atoms by its spontaneous decomposition reaction within a temperature range where vaporization and decomposition of the alkylamine for use as a reaction medium would not occur. In a case where the thermal stability of the composite compound formed of the reducing compound and the copper-containing compound is high, the temperature should be high for the decomposition. In such a case, alkylamine serving as a reaction medium would be vaporized and decomposed by itself, and therefore it becomes difficult to solve the problem of the present invention.

As the temperature to decompose the composite compound, a temperature of 220° C. or lower is preferred. If a temperature of 220° C. or higher is necessary for the generation of copper atoms by the reduction along with the decomposition of the composite compound, the speed of vaporization would be high in a case where dodecylamine or such an alkylamine having a carbon number of 12 is used as a reaction medium. Therefore, in practice, the alkylamine for use as a reaction medium has to be limited to a long-chain type having a carbon number of 18 or greater, which makes it difficult to produce fine coated copper particles having various functions. It is preferable particularly if the reducing compound is a type of compound which can form a composite compound capable of generating copper atoms at temperatures of 200° C. or lower, because of the point in which an alkylamine having a carbon number of about 12 can be stably used. Moreover, by setting the temperature to decompose the composite compound in the alkylamine to be 180° C. or lower, a medium-chain alkylamine having a carbon number of about 8 can be stably used and fine copper particles can be produced in relatively mild conditions. Therefore, it becomes possible to produce fine copper particles which have fine particle diameters with a narrow particle size distribution. In addition, this temperature is preferable from the point that an alkylamine of a low molecular weight having a relatively low boiling point can be used, and hence the production of fine copper particles from which the protective coating can be readily removed and which can be sintered at low temperatures is facilitated.

Typically, the reducing compound for forming the composite compound that is capable of generating copper atoms by decomposition at low temperatures of 220° C. or lower can be particularly preferably exemplified by hydrazine, hydroxylamine, and a compound selected from the group consisting of derivatives thereof. These compounds can form a composite compound by having the backbone nitrogen atoms binding to copper atoms in the copper-containing compound via coordinate bonds. Moreover, generally, because these compounds have stronger reducing power as compared to alkylamines, the thus formed composite compound can spontaneously decompose to reduce/separate copper atoms in relatively mild conditions, and thereby produce fine copper particles coated with an alkylamine.

Here, the term hydrazine derivative refers to a compound in which one to three hydrogen atoms contained in hydrazine have been substituted with a predetermined alkyl group(s) or the like. Moreover, the term hydroxylamine derivative refers to a compound in which one hydrogen atom contained in hydroxylamine has been substituted with a predetermined alkyl group or the like. By appropriately selecting and using such a derivative instead of using hydrazine or hydroxylamine, it is possible to adjust the reactivity with the copper-containing compound. Also it is possible to form a composite compound that can spontaneously decompose under an appropriate condition corresponding to the copper-containing compound to be used. In particular, when using a type of copper-containing compound which is likely to undergo a reduction reaction without forming a composite compound when mixed with hydrazine, it is effective to use an appropriately selected hydrazine derivative so as to promote the formation of a composite compound.

In addition, among the hydrazine derivatives and the like, use a lipophobic one as a reducing compound is particularly desirable to from the point that the reducing compound can be prevented from being eluted into an alkylamine when the composite compound is dispersed in the alkylamine and therefore the composite compound can be readily maintained, as will be described later.

Fine coated copper particles which are uniform with a narrow particle size distribution can be produced by binding the molecules of a reducing compound to the molecules of a copper-containing compound so as to form a composite compound that is capable of spontaneous decomposition by heating. In other words, as described in Japanese Unexamined Patent Publication No. 2010-24526 and Japanese Unexamined Patent Publication No. 2007-321215, when an attempt is made to cause decomposition by a reduction reaction of a predetermined metal compound by mixing a reducing agent to a system containing the metal compound, it is inevitable to have local fluctuations of the blend ratio of the metal compound to the reducing agent, and the like. For this reason, it is not always possible with these methods to uniformly cause a reduction reaction. Also it is difficult to achieve a uniform state of the atomic metal that has been generated from the reduction reaction.

In contrast, in the method according to the present invention, a uniform composite compound is previously formed by binding a predetermined proportion of a reducing compound to the molecules of a copper-containing compound that can be decomposed by reduction, and the thus formed composite compound is then subjected to a spontaneous reaction by adjusting the conditions such as the temperature and the like. Therefore, the limitation on the speed due to the supply of the reducing agent, and the non-uniformity of the reaction due to the concentration of the reducing agent can be avoided.

Moreover, in the method according to the present invention, since the reducing compound is used by previously binding to the copper-containing compound, it is possible to use an appropriate type of reducing compound by selection regardless of its compatibility with the reaction medium for when performing the copper reduction reaction. In other words, conventionally, in a case where copper is reduced by treating a copper compound with a reducing agent in a reaction medium, it has been necessary for the reducing agent to be compatible with the reaction medium to be used. For this reason, for example, in organic protective molecules, or in a nonaqueous organic solvent containing these molecules as a reaction medium, it is difficult to uniformly perform the reduction reaction if lipophobic hydrazine is used as a reducing agent, because these compounds can not be uniformly mixed with each other. By contrast, in the present invention, since a composite compound formed by previously binding a reducing compound to a copper-containing compound is used, it is possible to use an appropriate type of substance without a limitation on its compatibility with the reaction medium and the reducing compound.

In the present invention, it is preferable to mix the copper-containing compound and the reducing compound in a condition where the composite compound of a solid state can be formed by mixing the copper-containing compound of a solid state and the reducing compound of a liquid state. For example, if copper oxalate is used as the copper-containing compound and hydrazine is used as the reducing compound, the composite compound can be formed even by mixing both compounds at room temperature.

In addition, in a case where it is difficult to form the composite compound because the reduction reaction occurs directly at the time when the copper-containing compound and the reducing compound are mixed, it is desirable to mix them in a cooled environment so as to suppress the reduction reaction. Additionally, it is also possible to appropriately determine the temperature, the pressure, and other conditions at the time of mixing, corresponding to the reducing power of the reducing compound to be used and the like.

The ratio of the reducing compound to be mixed with the copper-containing compound for forming the composite compound is preferably a ratio equal to the molar ratio of the reducing compound to the copper-containing compound in the composite compound to be formed from them (hereunder, referred to as the "constant ratio"), or a ratio at which the reducing compound is richer. If the ratio of the reducing compound is lower than the constant ratio in the composite compound, some parts of the copper-containing compound will not form the composite compound, and there will exist unseparated metal atoms. As a result, the yield of the fine metal particles will be lowered. In addition, an excessive amount of the reducing compound not forming the composite compound will not be associated with the reduction/separation of copper atoms. Thus, the preferred blend ratio of the reducing compound is four times or less than the constant ratio in the composite compound. In practice, a favorable composite compound can be formed by mixing the reducing compound with the copper-containing compound so that the ratio of the reducing compound will be one to two times the constant ratio.

Regarding the reducing compound to be used, it is possible to use a mixture of two or more types of reducing compounds in accordance with their properties. Moreover, it is also possible to use a reducing compound which contains an appropriate additive component for the purpose of aiding the formation of the composite compound or the like, within a range where the property of the formed composite compound will not be inhibited. In particular, by having the presence of methanol, water, or such a polar molecule which will not cause a reaction with a substance in the system, as a reaction medium, then at the time of mixing the copper-containing compound and the reducing compound, the formation of the composite compound can be promoted and a uniform composite compound can be quickly formed.

Moreover, as will be described below, in the present invention, the thus obtained composite compound is decomposed under the presence of an alkylamine so as to produce fine copper particles. At this time, it is desirable to select the combination of the copper-containing compound and the reducing compound so that the solid state of the composite compound can be maintained in the alkylamine.

<Decomposition of Composite Compound and Production of Fine Coated Copper Particles>

Next, in the method for producing fine coated copper particles according to the present invention, the thus formed composite compound is separated from the excessive amount of the reducing compound, and then heated under the presence of a sufficient amount of alkylamine to cause a spontaneous decomposition reaction of the composite compound in which copper atoms are generated and aggregated. By so doing, fine copper particles coated with protective films composed of the used alkylamine can be obtained.

The reaction for generating copper atoms varies depending on the type of the composite compound used. For example, in a case where copper oxalate is used as the copper-containing compound and hydrazine (or a derivative thereof) is used as the reducing compound, fine coated copper particles are produced from the complex composed of copper oxalate and hydrazine as the composite compound. By heating this composite compound in an alkylamine, fine coated copper particles are produced while generating nitrogen gas, and also oxalic acid is generated in the alkylamine, even at a low temperature of about 150° C. This is presumed to be because the decomposition of the hydrazine part in the composite compound causes the reduction of adjacent copper to generate atomic copper, and also causes a progression of the reaction to make copper oxalate into oxalic acid. In the thermal decomposition of this composite compound, the reaction atmosphere is kept inert by the generated nitrogen gas. Thus, even if the thermal decomposition is performed in air, the thus produced fine coated copper particles can be efficiently kept from being oxidized. This makes it possible to produce stable fine coated copper particles.

Moreover, by use of the complex composed of copper oxalate and hydrazine as the composite compound for producing the fine coated copper particles, it becomes possible to produce fine coated copper particles at an extremely low temperature of around 150° C. Therefore, the range of the selection of alkylamines for use as a reaction medium is broadened, and the particle size of the fine copper particles can be made even finer.

Moreover, it is assumed that, at the time when the above-mentioned reaction occurs, amino groups of alkylamine molecules quickly form coordinate bonds with the generated copper atoms because a sufficient amount of alkylamine is present. For this reason, it is assumed that, at the time when the generated copper atoms form a copper particle by aggregation, a fixed number of copper atoms are aggregated, and a protective coating of the alkylamine is formed on the surface of the copper particle while preventing a greater number of copper atoms from aggregating thereto, as a result of which ultra-fine coated copper particles having uniform sizes are produced.

In addition, this mechanism helps to suppress the production of coarse copper particles. Thus, it is possible in the present invention to produce ultra-fine coated copper particles even under a condition where the composite compound serving as the supply source of copper atoms is present at high density. For this reason, in the production of fine copper particles, there is no need to use an excessive amount of a solvent so as to prevent the macro aggregation of copper particles, unlike in the generally performed manner. The production of fine coated copper particles is possible in a reaction system which contains essential components only, and it becomes possible to have the generated copper atoms in the form of ultra-fine coated copper particles at high yield.

Furthermore, by selecting, for example, a substance which mutually forms coordinate bonds to constitute a coordination polymer, or a similar substance, as the composite compound to supply metal atoms through decomposition, it becomes possible to maintain the local high density of copper atoms at the time when the composition is mixed with an alkylamine. Therefore, the recovery yield of the generated copper atoms in the form of ultra-fine coated copper particles can be increased.

<Alkylamine>

The alkylamine to be mixed with the composite compound at the time of the thermal decomposition of the composite compound mainly acts as a reaction medium of the decomposition reaction of the composite compound, as well as being used to form protective films that are mainly composed of the alkylamine on the surfaces of the produced fine copper particles, as described above. For this reason, the alkylamine for use in the present invention can be adopted by making an appropriate selection from known types of alkylamines in accordance with the condition of the thermal decomposition of the composite compound to be used, the expected property of the produced fine coated copper particles, and the like.

An alkylamine has a structure in which amino group(s) is/are bound to part(s) of alkyl group(s). Alkylamines generally tend to have a higher boiling point as the alkyl group has a greater molecular weight with a longer chain. On the other hand, those in which the alkyl group has a smaller molecular weight with a short chain tend to have a higher vapor pressure and stronger polarity. Moreover, among alkylamines, alkyldiamines having a plurality of amino groups tend to have a much stronger polarity.

Furthermore, so as to form coordinate bonds with copper atoms, it is desirable to use a type of alkylamine in which at least one of the amino groups is a primary amino group represented by $RNH_2$ (wherein, R represents a hydrocarbon chain) or a secondary amino group represented by $R_1R_2NH$ (wherein, $R_1$ and $R_2$ represent the same or different hydrocarbon chains). In addition, the hydrocarbon chain may contain a non-carbon atom such as oxygen, silicon, nitrogen, sulfur, phosphorus, and the like.

If a type of alkylamine having a strong polarity is used as the alkylamine for use in the thermal decomposition of the composite compound, generally, the reaction to generate fine coated copper particles tends to go smoothly, the particle diameter tends to be smaller, and the particle size distribution tends to be sharper. From this point it is preferable to use a type of alkylamine having a smaller molecular weight, within a range where neither vaporization nor decomposition will occur during the thermal decomposition of the composite compound. In addition, fine coated copper particles produced with use of an alkylamine having a smaller molecular weight are likely to have a higher vapor pressure of the protective film so that the film is more likely to be removed. Therefore, the sintering tends to be possible at much lower temperatures. However the copper particles tend to be more susceptible to oxidization during storage.

On the other hand, if a long-chain alkylamine having a greater molecular weight is used, the dispersibility into a non-polar solvent is increased, which is an advantage for a case where the fine copper particles are dispersed at a high weight ratio in an organic solvent for use as an ink. Moreover, it tends to be possible to obtain fine coated copper particles having strong protective films that are capable of preventing oxidization of the copper particles, even after long-term storage. In particular, in a case where fine copper particles having insufficiently effective protective coatings are exposed to the presence of oxygen such as in air, a problem arises in that oxidization proceeds so easily that oxidized films may be generated on the surfaces of these particles, and then the entire particles may be oxidized. For this reason, in the production of fine coated copper particles to be produced and used in air, it is preferable to perform the thermal decomposition of the composite compound in a reaction medium having a long-chain alkylamine of a carbon number of 12 or more as a main component, from the point of producing practically usable fine coated copper particles.

The alkylamine for use in the thermal decomposition of the composite compound is appropriately selected according to the purpose of the produced fine coated copper particles and the like, as mentioned above. The alkylamine having one amino group in the molecule (monoamine) can be exemplified by 2-ethoxyethylamine, dipropylamine, dibutylamine, hexylamine, cyclohexylamine, heptylamine, 3-butoxypropylamine, octylamine, nonylamine, decylamine, 3-aminopropyltriethoxysilane, dodecylamine, hexadecylamine, octadecylamine, oleylamine, and the like. Such alkylamines are practically usable from the point that these are industrially produced and easily available.

In particular, in a case where a long-chain alkylamine is used mainly for the purposes of improving the dispersibility of fine coated copper particles into an organic solvent and improving the oxidation resistance, long-chain alkylamines produced by substituting naturally-derived fatty acids with amino groups are easily obtainable and desirable to use in terms of the industry. In particular, oleylamine is easy to handle as a reaction medium, because it is in a liquid state at room temperature even though it has a carbon number of 18.

The alkyldiamine having two amino groups in the molecule can be exemplified by, but not limited to, ethylenediamine, N,N-dimethylethylenediamine, N,N'-dimethylethylenediamine, N,N-diethylethylenediamine, N,N'-diethylethylenediamine, 1,3-propanediamine, 2,2-dimethyl-1,3-propanediamine, N,N-dimethyl-1,3-diaminopropane, N,N'-dimethyl-1,3-diaminopropane, N,N-diethyl-1,3-diaminopropane, 1,4-diaminobutane, 1,5-diamino-2-methylpentane, 1,6-diaminohexane, N,N'-dimethyl-1,6-diaminohexane, 1,7-diaminoheptane, 1,8-diaminooctane, and the like.

Regarding the alkylamine for use in the thermal decomposition of the composite compound, it is either possible to use one type of alkylamine or to use a mixture of a plurality of types of alkylamines. In particular, the alkylamine for use as a reaction medium is preferably in a liquid state at room temperature in terms of easy handling. Thus, if a type of alkylamine having a large molecular weight which is in a solid state at room temperature has to be used, it is preferable to mix it with a substance having a small molecular weight so as to attain a liquid state. Particularly, the use of a mixture of oleylamine as a main component with various types of alkylamines, taking advantage of the fact that among the long-chain alkylamines, oleylamine is in a liquid state at room temperature, is preferable from the point of achieving both the handling properties during production and oxidation resistance of the produced fine coated copper particles. Moreover, since the vapor pressures of the respective alkylamines are reduced by using a plurality of types of alkylamines as a mixture, the use of an appropriate mixture including a type of alkylamine having a small molecular weight is effective for achieving a favorable protective film.

The amount of the alkylamine for use in the thermal decomposition of the composite compound is desirably equimolar or greater than the generated copper atoms, since all the generated metal atoms desirably form coordinate bonds with the alkylamine. On the other hand, if the amount of the mixed alkylamine is too much, the density of the metal atoms generated in the reaction system is decreased, as a result of which, the particle diameter of the produced fine copper particles tends to be uneven, and the yield of recovered copper atoms in the form of fine copper particles tends to decrease. For this reason, it is appropriate to set the amount of the alkylamine to be mixed with the composite compound so that the number of molecules of the alkylamine will be one to ten times greater than that of the generated copper atoms. Moreover, in order to reliably coordinate the alkylamine to the generated copper atoms, it is preferable to set the number of molecules of the alkylamine to be twice or greater than that of the generated copper atoms. In addition, if a sufficient level of mobility can be expected for the reason that the molecular weight of the alkylamine is small, or the like, it is sufficient for the alkylamine to form coordinate bonds with almost all copper atoms by setting the number of molecules of the alkylamine to be six times or smaller than that of the generated copper atoms.

When performing the thermal decomposition of the composite compound, it is possible to use an appropriate additive component by mixing within a range where the action of the alkylamine will not be hindered. At this time, if an organic or inorganic acid salt of copper is used as the copper-containing compound, it is desirable to suppress the ionization of the acid generated by the thermal decomposition of the composite compound.

<Fine Coated Copper Particles>

The fine coated copper particles according to the present invention have a mean particle diameter of 50 nm or smaller. Since the mean particle diameter is 20 nm or smaller, it is possible to form a copper film from these particles through removal of the protective films formed on their surfaces by sintering at much lower temperatures, as compared to a case of using a usual copper powder. Particularly, with use of a type of alkylamine having a higher vapor pressure at the time of the thermal decomposition of the composite compound, easily-removable protective films can be formed. Thus, the sintering at much lower temperatures becomes possible. Moreover, when using a type of alkylamine having a relatively large molecular weight, strong protective films are formed, and thereby oxidization of the produced fine coated copper particles is prevented. Thus, long-term storage in air becomes possible.

By taking advantage of this property, it is possible to use the fine coated copper particles mainly for the purpose of forming a copper film of a desired shape by various types of techniques. It is particularly effective for the purpose of forming copper wiring on a substrate having a low thermal resistance. In other words, a metal wiring or the like can be readily formed by printing in such a manner that: an ink-like substance made by dispersing the fine coated copper particles in an organic solvent is printed in a desired shape by various types of methods such as inkjet printing, and then heated to a predetermined temperature in an inert atmosphere so as to remove the protective film, so that the thus exposed fine copper powder is sintered together. Moreover, it is also possible to perform sintering after applying the fine coated metal particles with them still in a paste-like form or in a powdery form.

As other methods to cause sintering of the fine coated metal particles, a method of removing the protective films by means of electromagnetic waves such as ultraviolet rays, a method of removing the protective films by means of mechanically applying a pressure, or such methods can be used to remove the protective films, so as to bring the fine metal particles into contact with each other. By so doing, it is possible to cause sintering at much lower temperatures than usual sintering temperatures. In addition, it is also possible to use the fine coated metal particles according to the present invention for applications not only to form an electric circuit by printing, but also to form a conductor layer on a surface of a nonconductor instead of conventional electroless plating or the like, or to form an adhesion layer for use in mechanical or electrical bonding of metals by sandwiching the layer between these metals and pressing it with pressure.

Hereunder is a more specific description of the method for producing fine coated copper particles by the production method according to the present invention, with use of, as an example, a case where copper oxalate is used as the copper-containing compound and hydrazine monohydrate is used as the reducing compound. Needless to say, the material to be used for producing ultra-fine coated copper particles by the production method according to the present invention is not limited to the above-mentioned compounds and the combinations thereof, and any appropriately selected material compound can be used within a scope where the technical idea of the present invention can be applied.

(1) Synthesis of Copper Oxalate-Hydrazine Complex (Composite Compound)

A bluish white powder of copper oxalate was mixed with an excessive amount of hydrazine monohydrate (liquid) and the mixture stirred at room temperature, by which both the compounds formed a complex. By so doing, a purple copper oxalate-hydrazine complex (composite compound) was obtained. The composite compound was thought to be a complex formed as a result of coordinate-bonding through unshared electron pairs of nitrogen which constituted hydrazine to copper atoms contained in the copper oxalate.

In the formation of the copper oxalate-hydrazine complex, the complex formation could be smoothly performed by previously diluting hydrazine monohydrate by mixing with an appropriate amount of a diluting solvent such as methanol. The diluting solvent is not specifically limited and any type of solvent can be used, as long as it is compatible with hydrazine to thereby improve the fluidity thereof, as well as not cause a reaction with copper oxalate and hydrazine.

After sufficiently stirring the mixture to form the copper oxalate-hydrazine complex, the unreacted hydrazine and the diluting solvent were removed by centrifugal separation or such means. By so doing, a copper oxalate-hydrazine complex in a powdery form was obtained.

(2) Production of Fine Coated Copper Particles by Thermal Decomposition of Copper Oxalate-Hydrazine Complex By mixing the copper oxalate-hydrazine complex with an excessive amount of an alkylamine and heating the same, the copper oxalate-hydrazine complex caused a decomposition reaction in the alkylamine, by which nitrogen gas was emitted and fine coated copper particles showing the copper luster and oxalic acid (or alkylamine oxalate) were generated in the alkylamine.

In this reaction, it was presumed that: hydrazine having formed the complex with copper oxalate was decomposed, generated hydrogen atoms were substituted with copper atoms in the copper oxalate to thereby generate oxalic acid, and the atomic copper generated by the reduction was aggregated to form fine copper particles. In addition, it was presumed that the nitrogen gas generated by the hydrazine decomposition had been emitted to the outside of the system.

In the case where a type of substance that will not generate a sufficient amount of nitrogen gas or the like so as to create an inert atmosphere is used as a composite compound for producing the fine coated copper particles, then needless to say it is usually preferable to conduct heating or the like in an inert atmosphere such as an argon atmosphere so as to avoid contamination of the produced fine coated copper particles due to reaction with the atmosphere where the thermal decomposition is carried out, and to avoid decomposition of the protective film. In addition, it is preferable that the temperature for heating the composite compound in the alkylamine is roughly a boiling point or lower temperature of the amine to be used, from the point of preventing the removal of the alkylamine.

After completion of the decomposition reaction of the copper oxalate-hydrazine complex, the fine coated copper particles can be isolated as a powdery material by separation from the alkylamine and oxalic acid, or alkylamine oxalate made by the reaction therebetween. In this treatment, the fine coated copper particles can be isolated from a mixture of the alkylamine and an appropriate amount of the compatible solvent by centrifugation separation or such means.

(3) Fine Coated Copper Particles

FIG. 1 shows a transmission electron micrograph (JEOL JEM-4000EX) of the fine coated copper particles produced by using oleylamine as the alkylamine as mentioned above.

The fine coated copper particles shown in FIG. 1 had a mean particle diameter of 15.8 nm with approximately uniform particle diameters. Moreover, as is apparent from FIG. 1, the fine copper particles produced by the present invention are present in a state mutually separated by their protective films. Thus, nano-scale dispersion in an appropriate solvent is readily possible.

The reason for the production of such fine copper particles having fine and uniform particle diameters as well as being coated with protective films, can be inferred from the point that the thermal decomposition of the copper oxalate-hydrazine complex is conducted in an alkylamine. In other words, the reason can be presumed to be that the alkylamine molecules form coordinate bonds with the copper atoms that have been generated through reduction by the thermal decomposition of the complex, and the copper atoms in this state aggregate to form the fine copper particles. Therefore the protective films of the alkylamine are formed around the fine copper particles and these particles do not grow any further at the stage when a fixed amount of copper atoms have aggregated.

Figure 2:
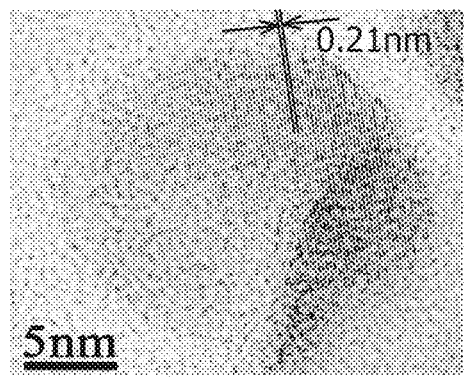
FIG. 2 is a high resolution transmission electron micrograph of a fine coated copper particle observed after dropping the toluene-diluted dispersion of the fine coated copper particles obtained in the Example 1 onto the microgrid, and drying the same. The spacing between lattice fringes is 0.21 nm, which corresponds to the crystal lattice of metal copper.

FIG. 2 shows a high resolution transmission electron micrograph of the fine coated copper particle shown in FIG. 1. As is apparent from FIG. 2, in the fine coated copper particle produced by the present invention, a lattice spacing corresponding to metal copper is observed. In addition, despite nanometer sized fine copper being susceptible to oxidization in air, in the fine coated copper particle shown in FIG. 2, the crystal lattice of copper is clearly observed even toward the surface of the copper particle and no generation of any oxidized matter or the like is found, regardless of the fact that the particles had been produced in air and then the particles in a powdery state had been exposed to air for about 500 hours.

Moreover, in the fine coated copper particles shown in FIG. 1 and FIG. 2, no significant change in weight was found even in a case where the particles had been exposed to air after production, and no conspicuous signal coming from oxidized copper was observed in the powder X-ray diffraction. From these results, regarding the fine coated copper particles according to the present invention, it can be presumed to be possible to form protective coatings that are capable of preventing oxidization of copper very efficiently, by selecting a relatively long-chain compound as the alkylamine to be used. These particles are easy to handle because of their favorable oxidation resistance even in air, and hence the long-term storage becomes possible. Moreover, with such fine coated copper particles produced by using a long-chain alkylamine in this way, it is possible to disperse these fine coated copper particles at high density of 30 weight % or higher in toluene or such a non-polar dispersion medium.

In addition, it is also possible to favorably disperse the fine coated copper particles of the present invention in a polar solvent or a mixture solvent of polar and non-polar materials, by selecting an alkylamine for use in the production. Moreover, it is also possible to apply the particles in a powdery state to an object to be treated. By taking advantage of these characteristics, for the fine coated copper particles according to the present invention, it becomes possible to select over a wide range, the type of the dispersion medium, the combination thereof, the mixing ratio thereof, and the like, corresponding to the purpose of the application. Also it becomes easy to adjust the volatility and the viscosity thereof. Thus, the fine coated copper particles according to the present invention are suitable for the production of an ink that is applicable to various kinds of printing techniques such as inkjet printing.

Moreover, as described above, in the fine coated copper particles according to the present invention, the alkylamine which forms the protective film is bound to copper atoms by a relatively weak force of coordinate bonds, and thereby is detachable by a relatively small driving force. For this reason, it is possible to form a copper film having a favorable electrical conductivity and a favorable thermal conductivity by using a dispersion made by dispersing the fine coated copper particles in a dispersion medium having an appropriate volatility and applying it to a desired substrate by the spin coat method or the inkjet printing method, and thereafter removing the protective coatings by heat, electromagnetic waves, other mechanical energy, or the like, so as to cause sintering at low temperatures. With these characteristics, an electric circuit can be formed on a substrate and rendered electrically conductive at low temperatures, and various kinds of members can be readily bonded by heat.

Hereunder, an example of the method for producing fine coated copper particles and an example of the thus produced fine coated copper particles are shown as Examples, although the present invention is not to be limited to these Examples.

EXAMPLES

1. Synthesis of Composite Compound Composed of Copper-Containing Compound and Reducing Compound Copper oxalate was used as the copper-containing compound and hydrazine monohydrate was used as the reducing compound. Copper oxalate was charged to a mixed solution previously made by mixing hydrazine monohydrate and methanol as a reaction medium at the proportions shown in Table 1 (Examples 1 to 4) at room temperature. The mixture was stirred for 10 minutes. By so doing, a copper oxalate-hydrazine complex (composite compound) was formed. The color of the copper oxalate was quickly changed from bluish white to purple when mixed with hydrazine. Thereafter, the unreacted hydrazine and methanol were removed by centrifugal separation, and the resulting product was dried. By so doing, a purple powder was obtained.

Figure 3:
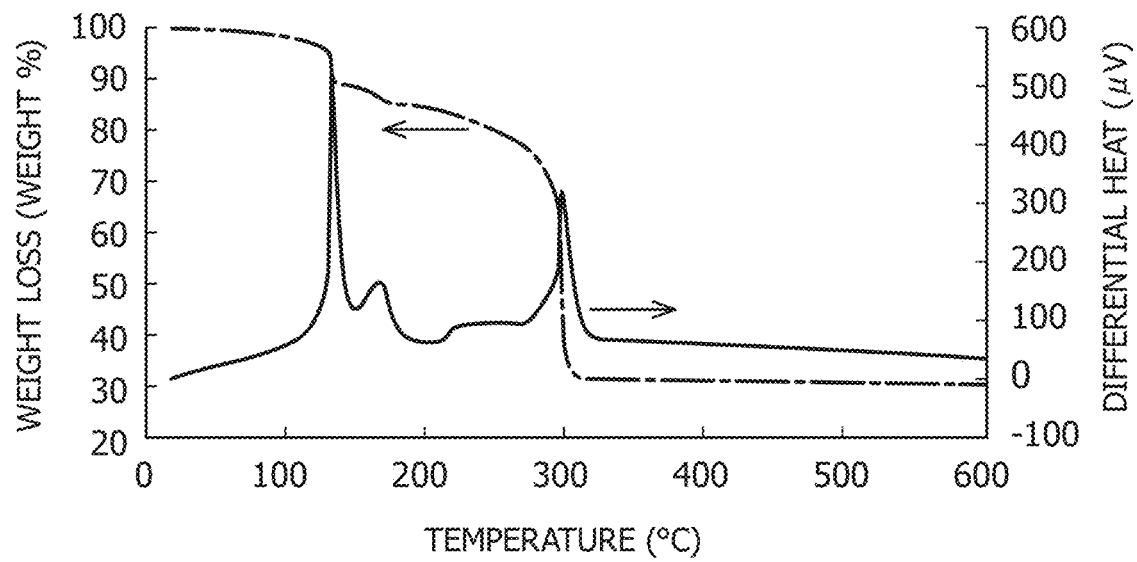
FIG. 3 shows the results of thermogravimetric differential thermal simultaneous analysis of a copper oxalate-hydrazine complex. The numbers of binding molecules of hydrazine and oxalate ions to copper atoms contained in the copper oxalate-hydrazine complex are determined from the thermal weight loss (weight %) (copper:hydrazine:oxalate ion=1:2:1 (molar ratio)).

The obtained purple powder was subjected to thermogravimetric differential thermal simultaneous analysis (Shimadzu DTG-60). The results are shown in FIG. 3. Weight losses were observed around 130° C. and 300° C. The weight loss around 130° C. was presumed to correspond to the removal of hydrazine molecules having been coordinately bound to copper atoms. Moreover, from the ratio of the weight loss thereof, the purple powder obtained by the above-mentioned treatment was presumed to be a copper oxalate-hydrazine complex in which molecules of hydrazine are coordinately bound to molecules of copper oxalate at a proportion of two molecules of hydrazine to one molecule of copper oxalate. In addition, the weight loss around 300° C. was presumed, from the ratio of the weight loss thereof, to correspond to the removal of oxalate ions from copper atoms.

2. Synthesis of Fine Coated Copper Particles

An alkylamine was added to the total amount of the copper oxalate-hydrazine complex obtained from each Example at the blend ratio and the amount as shown in Table 1. The mixture was stirred at room temperature for 10 minutes to make a suspension. After stirring, the container containing the mixed solution was heated in an oil bath at 150° C. Bubbles were generated from the mixed solution and the color was changed to red with heating. Then, the solution was kept heated and stirred for one hour. By so doing, a suspension showing the copper luster was obtained.

As will be described below, in the obtained suspension, fine copper particles coated with protective films of the alkylamine were suspended. Thus, it was shown to be possible, by previously forming a complex of copper oxalate and hydrazine, to produce fine copper particles by spontaneous decomposition reaction with heating.

For the purpose of comparison, an experiment to heat copper oxalate without using hydrazine in an alkylamine was performed under the conditions of the Comparative Example in Table 1. The experiment was carried out in the same manner as those of Examples 1 to 4, except for not using hydrazine monohydrate.

As a result, when the copper oxalate was heated to 150° C. in oleylamine, the color of the copper oxalate was changed to green, showing the formation of a complex compound. However, even though the complex compound was heated to about 350° C. which is the boiling point of oleylamine, there was no generation of metal copper particles.

Regarding the type of alkylamine used in the above-mentioned experiments, those prepared by using, as a base material, oleylamine (having a carbon number of 18) which is a liquid at room temperature among long-chain alkylamines for the purpose of easy handling in the experiments, and appropriately mixing/solving solid octadecylamine (having a carbon number of 18) or solid hexadecylamine (having a carbon number of 16) respectively, were used. Moreover, those prepared by appropriately mixing dodecylamine (having a carbon number of 12) or octylamine (having a carbon number of 8) serving as a medium-chain or short-chain alkylamine, and rendered to be in a fluid state at room temperature, were also used.

The thus obtained suspension was diluted with hexane, and then subjected to centrifugal separation to remove unreacted alkylamine and generated oxalic acid, and alkylamine oxalate made by the reaction therebetween. By so doing, fine coated copper particles were obtained as a precipitate.

The yields of copper obtained as the fine coated copper particles relative to the copper in the copper oxalate used in the respective Examples are shown (Table 1). When using a copper oxalate-hydrazine complex as a composite compound for producing fine coated copper particles, the yield of copper of roughly about 60 to 65% was achieved irrespective of the type of the alkylamine even in air. The above-mentioned yield of copper was obtained on the basis of the mass weight of the copper having been determined by subtracting the mass weight of the attached alkylamine as protective films from the mass weight of the obtained fine coated copper particles.

3. Evaluation of Fine Coated Copper Particles

Figure 4:
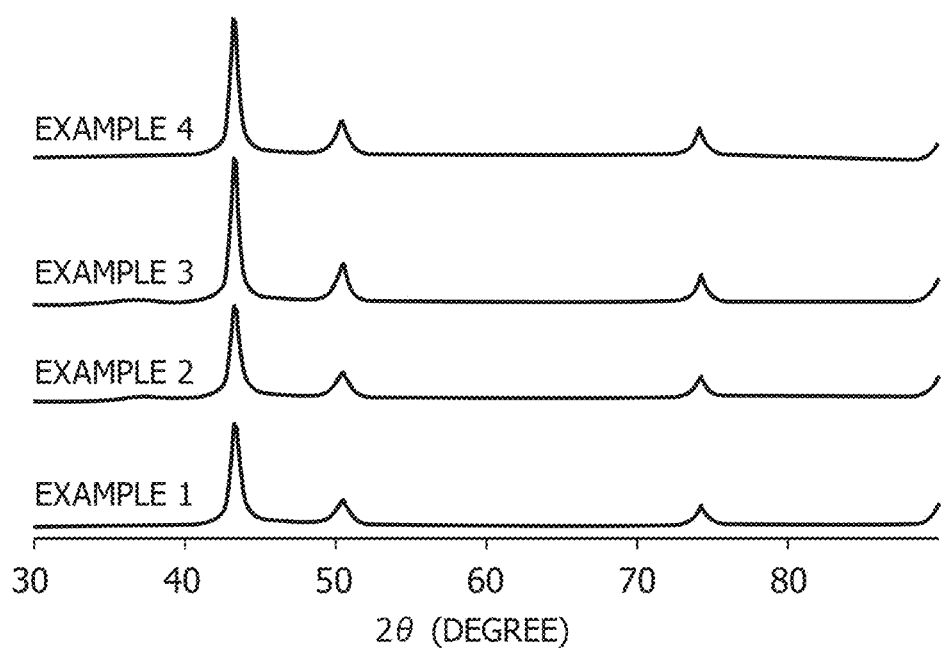
FIG. 4 shows powder X-ray diffraction patterns of the fine coated copper particles obtained in the Examples 1 to 4. The signal peaks are broad. The sizes of single crystallites calculated from the half-widths of the signals are from 5 to 7 nm.

FIG. 4 shows powder X-ray diffraction patterns (Rigaku Mini Flex II) of the obtained fine coated copper particles (Examples 1 to 4). From the powder X-ray diffraction patterns, the fine coated copper particles are shown to be composed of metal copper having average sizes of single crystallites of about 5 to 7 nm.

The FT-IR spectra of the fine coated copper particles obtained from Examples 1 to 4 were measured. As a result, all types of the fine coated copper particles showed absorptions derived from alkyl chains of the alkylamine around 2900 $cm^{-1}$. This confirmed that the fine coated copper particles obtained by the present invention contained alkylamine.

Figure 5:
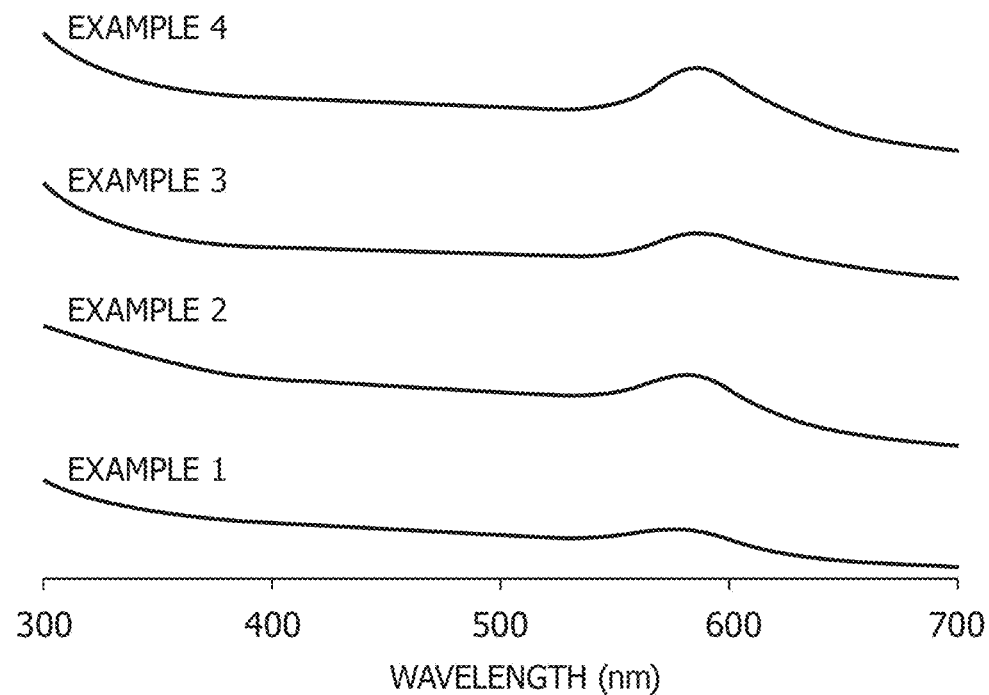
FIG. 5 shows ultraviolet and visible absorption spectra of toluene-diluted dispersions of the fine coated copper particles obtained in the Examples 1 to 4. Surface plasmon bands characteristic to metal fine copper particles of a nanometer size are seen from 570 to 590 nm.

FIG. 5 shows ultraviolet and visible absorption spectra (Shimadzu MultiSpec-1500) of toluene-diluted dispersions of the fine coated copper particles (Examples 1 to 4). In all cases, surface plasmon bands peculiar to fine copper particles were observed from 570 to 590 nm. The fine copper particles were found to be stably present without being oxidized on the surfaces even in the dispersions.

4. Production of Copper Thin Film by Using Copper Ink

The fine coated copper particles obtained from Examples 2 to 4 were respectively used as an ink to form a copper thin film on a glass substrate by the method described below. To 0.15 g of the respective fine coated copper particles produced in the above-mentioned manner was added 173 µL of toluene as the dispersion medium, by which a 50 wt % dispersion of the fine coated copper particles was prepared. This was used as a copper ink. 100 µL of the respective copper ink was applied to a glass substrate by spin coating. Thereafter, the substrate was heated in an argon atmosphere to 300° C. at 60° C./min, and held as it was for 30 minutes. By so doing, the copper thin film was obtained.

Figure 6:
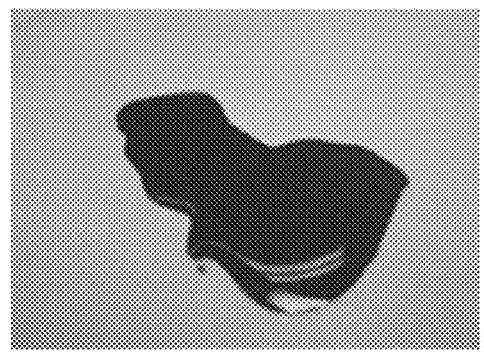
FIG. 6 is a photograph of a paste made by adding terpineol and octylamine to the fine coated copper particles obtained in the Example 1 (percentage content of fine coated copper particles: 40 wt %).

Table 1 shows resistance values of the copper thin films obtained by using the respective fine coated copper particles. Each resistance value was measured by the four-point probe method (Kyowa Riken K-705RS). All copper thin films by using the fine coated copper particles produced by Examples 1 to 4 showed sufficiently low resistance values for functioning as copper wiring.

night to make a paste. FIG. 6 shows a photograph of the thus produced paste (percentage content of fine coated copper particles: 40 wt %).

The produced paste was applied to a glass substrate by spin coating. Thereafter, the substrate was heated in an argon atmosphere to 300° C. at 10° C./min, and held as it was for 60 minutes. By so doing, the copper thin film was obtained.

The obtained copper thin film showed the copper luster with a resistance value of about 27.7Ω/□, which is enough to function as a conductive film.

6. Production of Copper Thin Film (Pellet) by Compressing Fine Coated Copper Particles with Pressure The fine coated copper particles obtained from Example 1 were compressed at room temperature to produce a pellet by the method described below. 0.18 g of the fine coated copper particles obtained from Example 1 were filled in a tablet forming machine (8 mmφ) at room temperature, and pressurized in a reduced pressure with a force of 40 kN for 10 minutes. By so doing, the copper thin film (pellet) was produced. The produced pellet showed the copper luster with a sheet resistance of 13.2Ω/□.

As is apparent from this result, the fine coated copper particles according to the present invention were able to achieve sufficient electrical conduction through sintering

TABLE 1

| | Formation of copper oxalate-hydrazine complex | | | Thermal decomposition of copper oxalate-hydrazine | Yield of fine coated copper particles (%) (percentage content of alkylamine (weight %)) | Sheet resistance of sintered film (Ω/□) (dispersed state) |
|---|---|---|---|---|---|---|
| | Copper oxalate (mmol) | Hydrazine monohydrate (mmol) | Methanol (mL) | complex Alkylamine (mmol) | | |
| Example 1 | 3.33 | 13.2 | 5 | Oleylamine: 16.6 | 61.5% (11.6%) | 27.7 (paste-like form) |
| Example 2 | 13.2 | 13.4 | 5 | Oleylamine: 44.0 Octadecylamine: 8.80 (Total: 52.8 mmol) | 63.5% (11.3%) | 0.178 (ink-like form) |
| Example 3 | 13.2 | 14.4 | 5 | Oleylamine: 46.2 Octadecylamine: 6.60 Hexadecylamine: 6.60 Dodecylamine: 6.60 (Total: 66.0 mmol) | 62.5% (10.1%) | 0.262 (ink-like form) |
| Example 4 | 13.2 | 14.4 | 5 | Oleylamine: 33.0 Octylamine: 22.0 Octadecylamine: 11.0 (Total: 66.0 mmol) | 62.7% (8.91%) | 0.128 (ink-like form) |
| Comparative Example | 13.2 | — | 5 | Oleylamine: 66.0 mmol | — | — |

5. Production of Copper Thin Film by Using Copper Paste

The fine coated copper particles obtained from Example 1 were used to produce a copper paste, and a copper thin film was formed on a glass substrate by the method described below. In order to produce a paste containing the fine coated copper particles, 0.30 g of terpineol and 0.30 g of octylamine were added to 0.40 g of the fine coated copper particles obtained from Example 1 and the mixture was stirred over even at room temperatures by having the protective films removed with mechanical pressure and having the copper particles contacted with each other.

It should be noted that the entire contents of Japanese Patent Application No. 2010-215910, filed on Sep. 27, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A method for producing fine coated copper particles, comprising:
   a first step of mixing a copper-containing compound and a reducing compound to form a composite compound comprising the copper-containing compound and the reducing compound, that is capable of thermal decomposition to generate copper in an alkylamine; and
   a next step of heating the composite compound in the alkylamine to produce fine copper particles coated with the alkylamine.

2. The method for producing fine coated copper particles according to claim 1, wherein said step to produce fine copper particles is performed at a temperature of 220° C. or lower.

3. The method for producing fine coated copper particles according to claim 1, wherein said reducing compound contains hydrazine, hydroxylamine, or a derivative thereof.

4. The method for producing fine coated copper particles according to claim 1, wherein said copper-containing compound is a compound in which copper is bound by oxygen-based ligands.

5. The method for producing fine coated copper particles according to claim 4, wherein said compound in which copper is bound by oxygen-based ligands is copper oxalate.

6. The method for producing fine coated copper particles according to claim 1, wherein said alkylamine contains a long-chain alkylamine having a carbon number of 12 or more.

* * * * *